United States Patent
Ishida et al.

(10) Patent No.: US 8,125,105 B2
(45) Date of Patent: Feb. 28, 2012

(54) POWER SUPPLY DEVICE AND CONSTRUCTION MACHINE

(75) Inventors: Toshihiko Ishida, Hitachi (JP); Toshihiro Kimura, Ishioka (JP); Tetsuhiro Doi, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 174 days.

(21) Appl. No.: 12/603,097

(22) Filed: Oct. 21, 2009

(65) Prior Publication Data

US 2010/0096921 A1    Apr. 22, 2010

(30) Foreign Application Priority Data

Oct. 22, 2008    (JP) ................. 2008-272168

(51) Int. Cl.
*H02J 1/00*    (2006.01)
(52) U.S. Cl. ............. 307/86; 307/9.1; 307/10.1; 307/82
(58) Field of Classification Search .................. 307/9.1, 307/64–66, 72–75, 85–87
See application file for complete search history.

(56) References Cited

U.S. PATENT DOCUMENTS

| | | | | |
|---|---|---|---|---|
| 5,747,891 A | * | 5/1998 | Williams | 307/87 |
| 6,175,311 B1 | * | 1/2001 | Li | 340/657 |
| 6,737,762 B2 | * | 5/2004 | Koenig | 307/48 |

FOREIGN PATENT DOCUMENTS

| JP | 2007-228715 A |   | 9/2007 |
|---|---|---|---|
| JP | 2007228715 A | * | 9/2007 |

* cited by examiner

*Primary Examiner* — Jared Fureman
*Assistant Examiner* — Alfonso Perez Borroto
(74) *Attorney, Agent, or Firm* — Crowell & Moring LLP

(57) ABSTRACT

A power supply device comprises a bidirectional voltage converter unit that performs voltage stepping up or voltage stepping down between a first terminal and a second terminal; a first switching unit that applies a DC voltage obtained from the first electric power supply source to the first terminal; a second switching unit that applies a DC voltage obtained from the second electric power supply source to the first terminal; a third switching unit that applies a DC voltage obtained from the first electric power supply source to the second terminal; an output unit that outputs a predetermined DC voltage from the second terminal; and a switching control unit that controls switching of the first switching unit, the second switching unit and the third switching unit.

6 Claims, 7 Drawing Sheets

POWER SUPPLY DEVICE AND CONSTRUCTION MACHINE

INCORPORATION BY REFERENCE

The disclosure of the following priority application is herein incorporated by reference: Japanese Patent Application No. 2008-272168 filed Oct. 22, 2008.

BACKGROUND OF THE INVENTION

1. Field of the Invention

The present invention relates to a power supply device that is connected to at least two electric power sources and that outputs a DC voltage. The present invention also relates to a construction machine to which this power supply device is mounted.

2. Description of Related Art

A battery driven construction machine is known from the prior art. In Patent Document #1, there is described a construction machine that employs an electric motor as a drive power source, and whose power supply unit can be connected either to a three phase power supply grid or to a high voltage battery. The three phase voltage from the three phase power supply grid is supplied via an AC/DC converter to an inverter of the electric motor, while on the other hand the DC voltage from the high voltage battery is used, just as it is, as a drive voltage for the inverter.

Patent Document #1: Japanese Laid-Open Patent Publication No. 2007-228715.

This type of power supply unit has the advantage that it is not subject to constraints upon its range of utilization, since it can selectively utilize either an AC power supply grid or an internal battery. However it suffers from the inconveniences that a three phase AC power supply is essential, since with a single phase household power supply the electrical current becomes too great, and moreover that a high voltage battery is essential in order to match the drive voltage of the inverter. Furthermore there is the problem that it is not possible to charge such a high voltage battery from an AC power supply grid that is at low voltage, unless a boosting chopper circuit or the like is provided separately.

SUMMARY OF THE INVENTION

A power supply device according to a first aspect of the present invention, which receives supply of electric power from a first electric power supply source or from a second electric power supply source and generates a predetermined DC voltage, comprises: a bidirectional voltage converter unit that includes a first terminal and a second terminal and performs step-up converting or step-down converting between the first terminal and the second terminal; a first switching unit that applies a DC voltage obtained from the first electric power supply source to the first terminal of the bidirectional voltage converter unit; a second switching unit that applies a DC voltage obtained from the second electric power supply source to the first terminal of the bidirectional voltage converter unit; a third switching unit that applies a DC voltage obtained from the first electric power supply source to the second terminal of the bidirectional voltage converter unit; an output unit that outputs the predetermined DC voltage from the second terminal of the bidirectional voltage converter unit; and a switching control unit that controls switching of the first switching unit, the second switching unit and the third switching unit.

According to a second aspect of the present invention, in the power supply device of the first aspect, it is preferable that: the DC voltage from the first electric power supply source is obtained by rectifying an AC voltage of an AC power supply grid or obtained from an external battery; the DC voltage from the second electric power supply source is obtained from an internal battery; the bidirectional voltage converter unit is a bidirectional type of voltage converting chopper circuit; and the switching control unit controls the switching of the first switching unit, the second switching unit and the third switching unit, on the basis of the DC voltage obtained from the first electric power supply source and the DC voltage obtained from the second electric power supply source.

According to a third aspect of the present invention, in the power supply device of the first or second aspect, the switching control unit may transmit electric power from the first electric power supply source to the second electric power supply source via the bidirectional voltage converter unit, by opening the first switching unit, closing the second switching unit and closing the third switching unit.

According to a fourth aspect of the present invention, in the power supply device of the first or second aspect, the switching control unit may output the predetermined DC voltage from the first electric power supply source to the outside via the bidirectional voltage converter unit, by closing the first switching unit, opening the second switching unit and opening the third switching unit.

A construction machine according to a fifth aspect of the present invention, which uses an electric motor as a drive power source, comprises: the power supply device of any one of the first through fourth aspects; an inverter circuit that operates upon the DC output voltage of the power supply device; and an electric motor driven by the inverter circuit.

According to a sixth aspect of the present invention, in the construction machine of the fifth aspect, it is preferable that: the first electric power supply source is an external AC power supply grid or an external DC power supply; and the second electric power supply source is a battery internal to a main body of the construction machine.

According to the present invention, it is possible for a power supply device not only to utilize an electric power supply source irrespective of its type and voltage level, but also to supply electric power from one electric power supply source to the other electric power supply source. Therefore, it is possible to provide a power supply device that can be utilized extremely generally and that can be used in many applications. Moreover, by using a power supply device according to the present invention as an inverter drive supply, it is possible to implement a construction machine that does not suffer from limitations of location or region of use.

DESCRIPTION OF THE PREFERRED EMBODIMENTS

Embodiments of the present invention will now be explained in detail with reference to the drawings.

Embodiment

Figure 1:
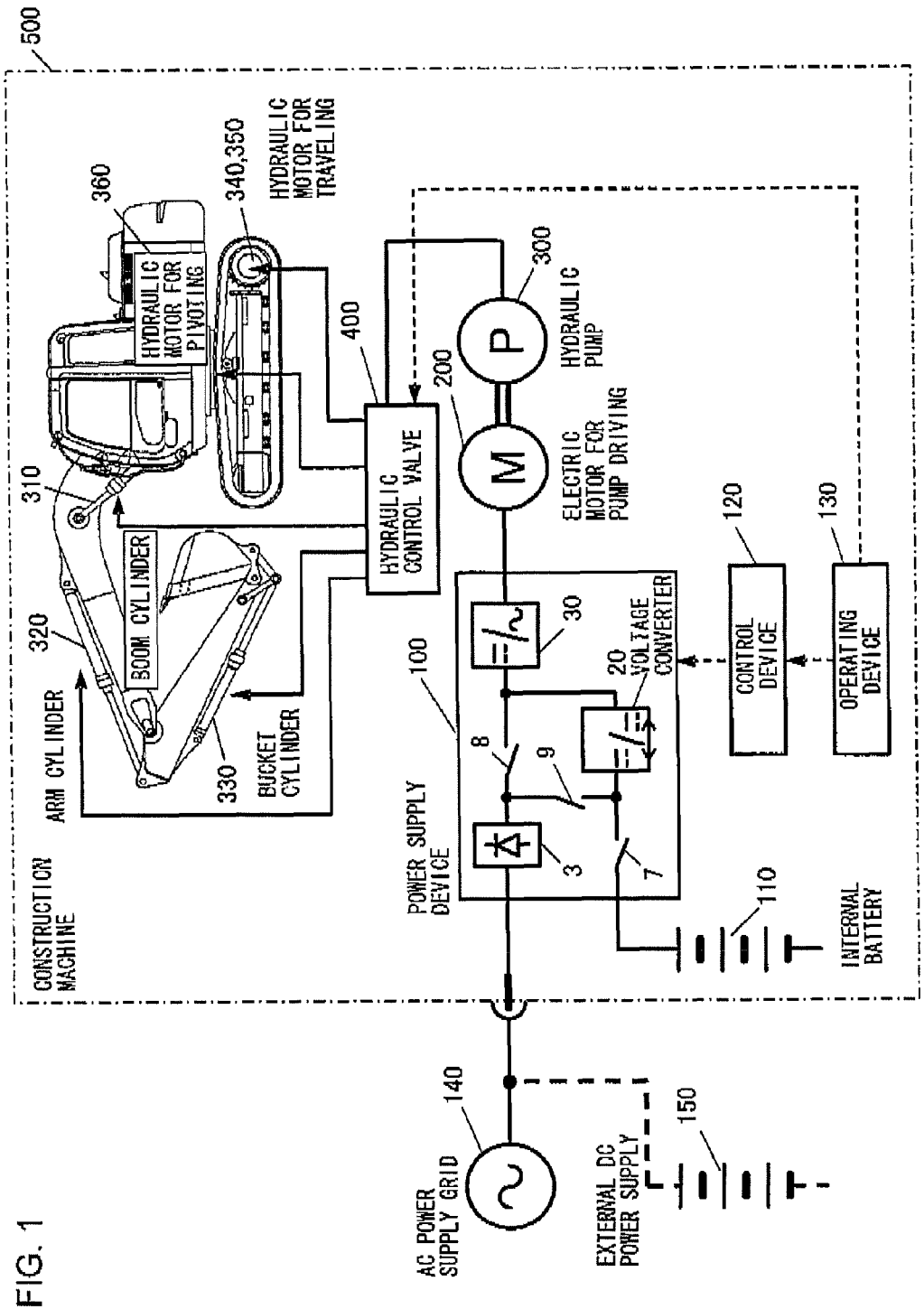
FIG. 1 is an overall structural diagram of a construction machine to which the present invention has been applied.
Figure 2:
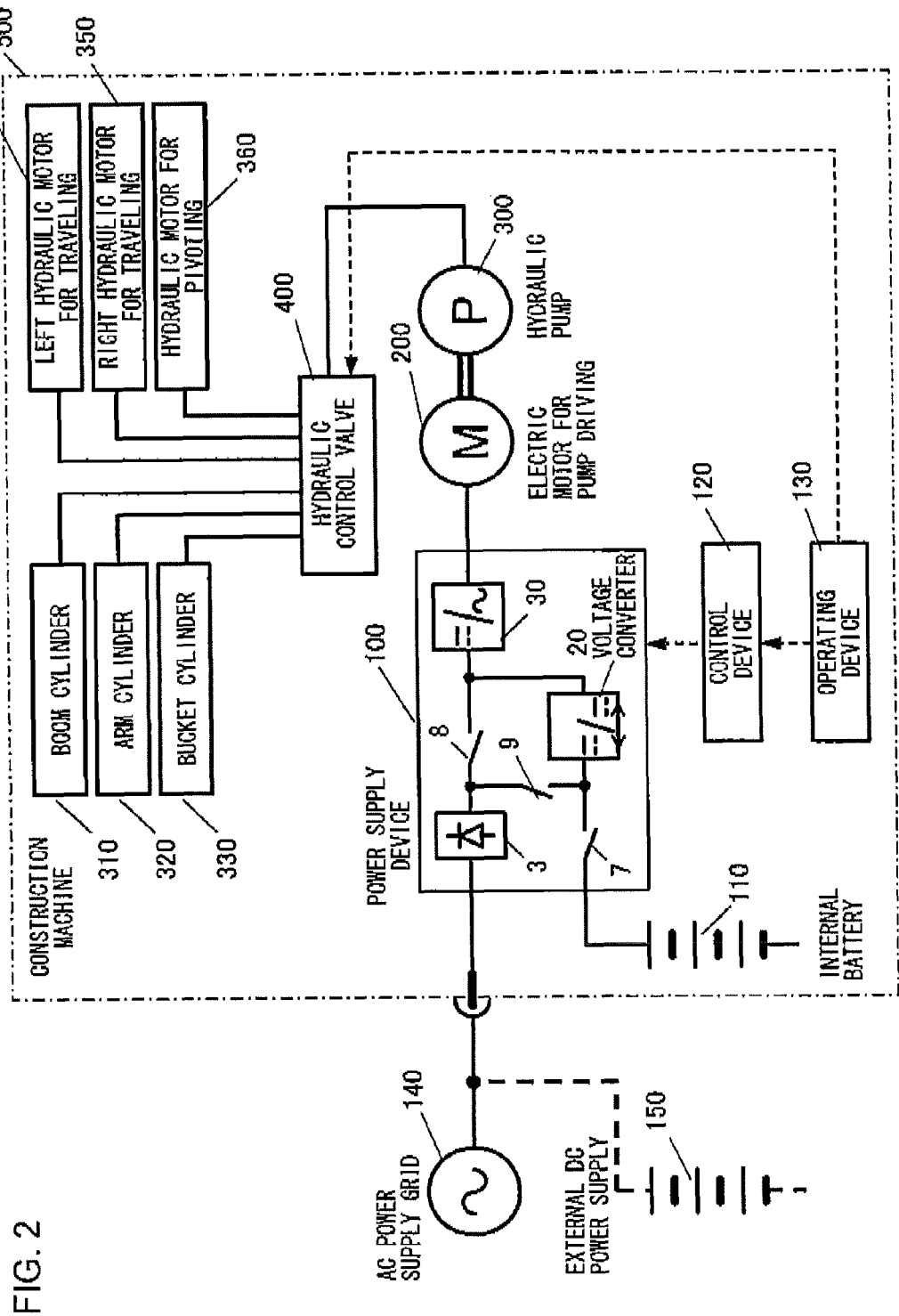
FIG. 2 is a block diagram that focuses upon a hydraulic system of this hydraulic excavator.

FIG. 1 is a figure showing the overall structure of a construction machine to which the present invention has been applied. In this explanation of an embodiment, a hydraulic excavator is cited as one example of a construction machine. FIG. 2 is a block diagram that focuses upon a hydraulic system of this hydraulic excavator. In these figures, the reference numeral 100 represents a power supply device, the reference numeral 200 represents an electric motor for driving a hydraulic pump, the reference numeral 300 represents that hydraulic pump, the reference numeral 400 represents a hydraulic control valve, and the reference numeral 500 represents the hydraulic excavator as a whole. The power supply device 100, an internal battery 110, a control device 120, an operating device 130, the electric motor 200, the hydraulic pump 300, and the hydraulic control valve 400 are mounted to the hydraulic excavator 500.

The power supply device 100 includes a rectifier 3, a switch 7, a switch 8, a switch 9, a bidirectional buck-boost converter 20, and an inverter 30. The bidirectional buck-boost converter 20 is a chopper circuit that can either step up or step down the voltage at its one terminal with respect to the voltage at its other terminal, irrespective of the direction of current flow. An AC power supply grid 140 and the internal battery 110 are connected to the power supply device 100. Instead of the AC power supply grid 140, it would also be possible to connect an external DC power supply 150 (i.e. an external battery).

The control device 120 is connected to the power supply device 100. According to operator input command via the operating device 130, the control device 120 controls the opened/closed states of the switches 7, 8, and 9, and simultaneously sets the conversion ratio of the bidirectional buck-boost converter 20. Moreover, the control device 120 also may control the opened/closed states of the switches 7, 8, and 9 by detecting the DC voltage obtained from the AC power supply grid 140 (or the external DC power supply 150), and the DC voltage obtained from the internal battery 110. The relationship between the DC voltage obtained from the AC power supply grid 140 (or the external DC power supply 150) and the DC voltage obtained from the internal battery 110, and the opened/closed states of these various switches, will now be explained.

—Operation Using an AC Power Supply Grid 140—

Figure 3:
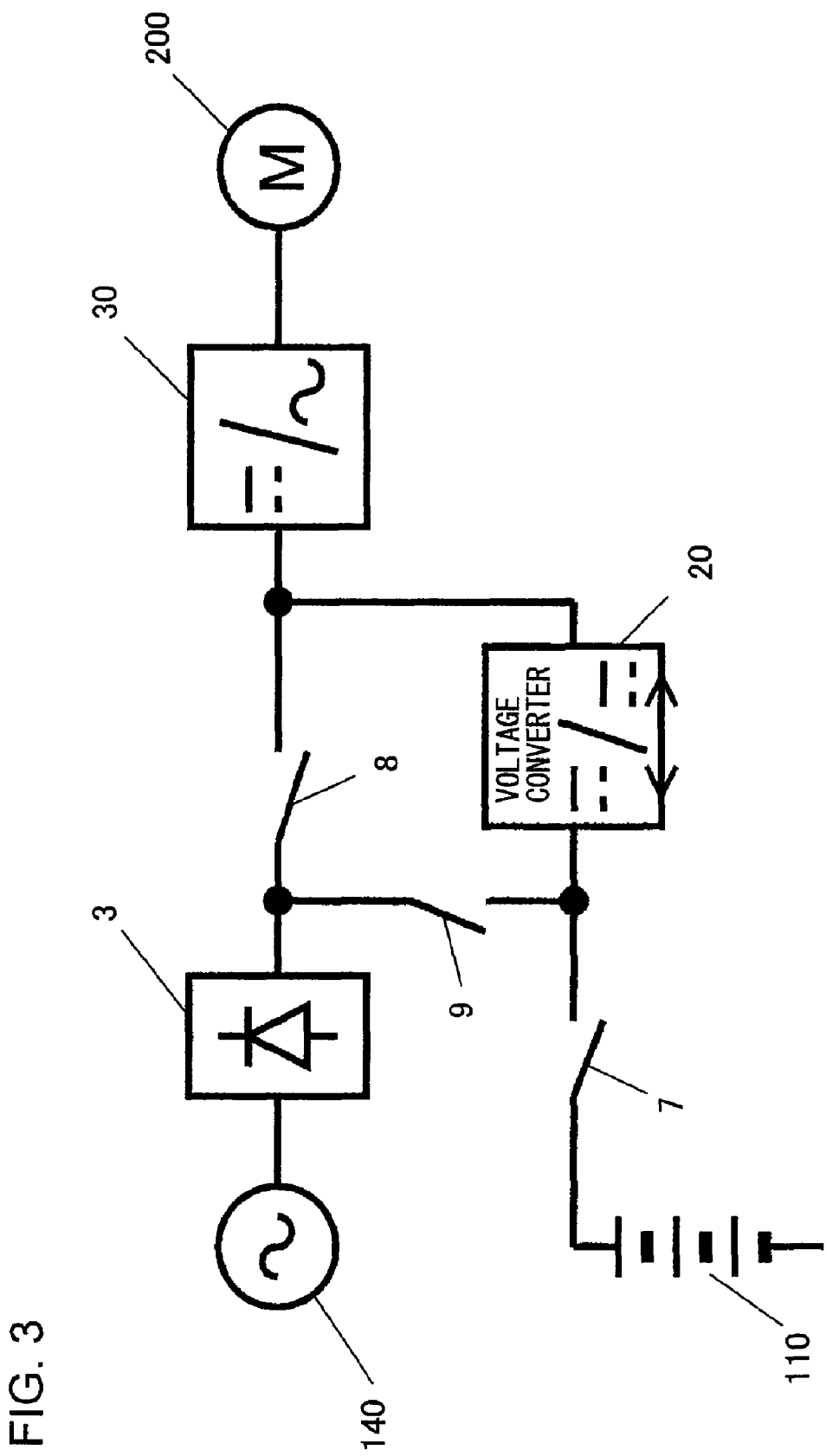
FIG. 3 is a block diagram for explanation of the operation of a power supply device 100.

FIG. 3 is a block diagram in which the power supply device 100 is shown as extracted. Here, a case is described in which a three phase 200 volt system is used as the AC power supply grid 140, a 100 volt class battery is used as the internal battery 110, and an inverter for 200 volt system power supply is used as the inverter 30.

Figure 4:
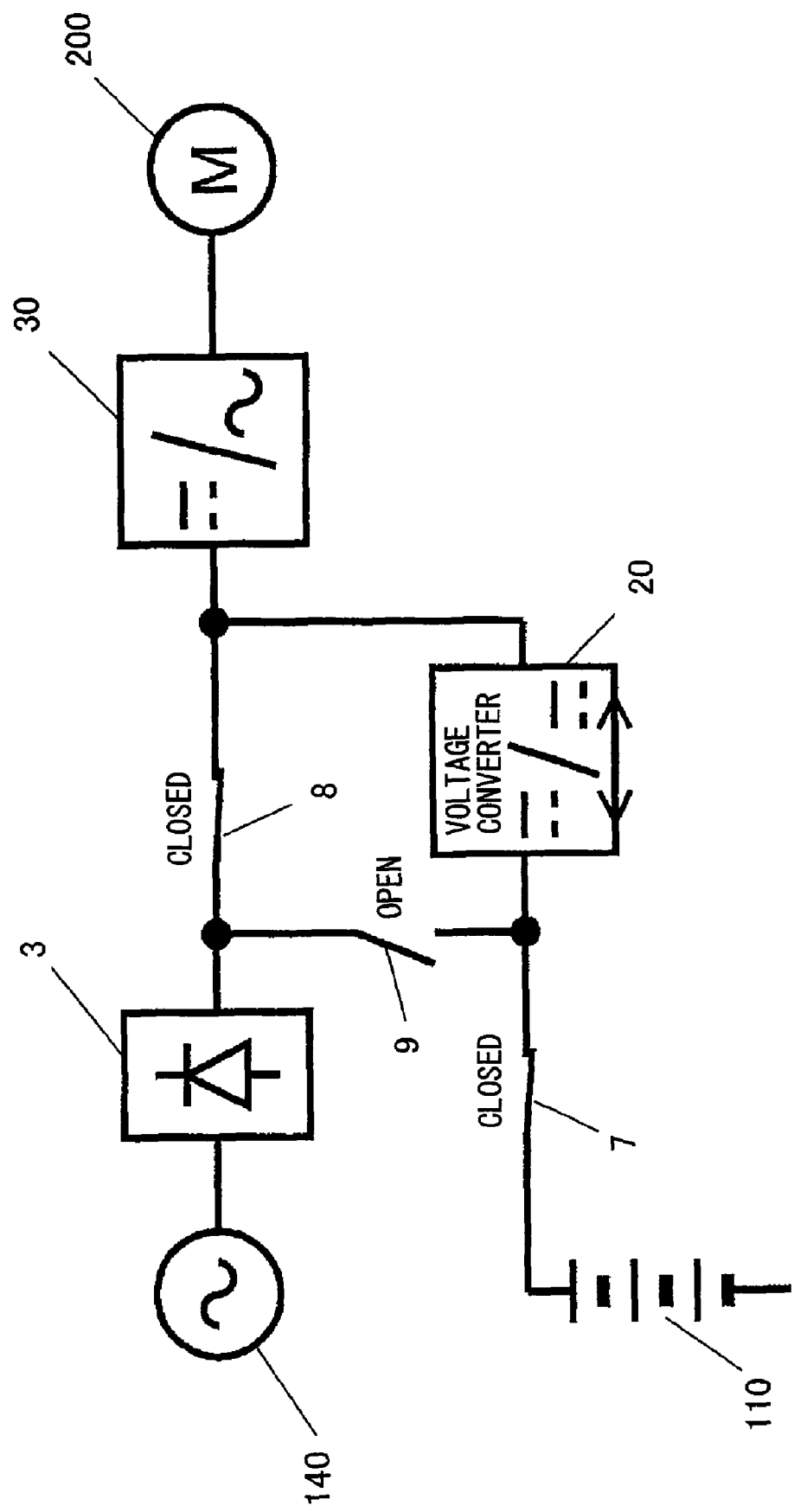
FIG. 4 is a block diagram for explanation of the operation of a power supply device 100.

FIG. 4 is a block diagram showing the opened/closed states of the switches 7, 8, and 9 in this case. As shown in this figure, by closing the switches 7 and 8 while opening the switch 9, it is possible to utilize either electric power from the AC power supply grid 140 or electric power from the internal battery 110 as the electric power for driving the electric motor 200. Moreover, when the internal battery 110 has been discharged, it is possible to supply electric power for recharging the internal battery 110 from the AC power supply grid 140, via the bidirectional buck-boost converter 20.

As an example of another mode of operation, a case will be described in which the AC power supply grid 140 is a single phase 100 volt system, the inverter 30 is an inverter for 200 volt system power supply, and the internal battery 110 is a 100 volt class battery. In this case, in the same manner as in FIG. 4, it becomes possible to charge up the internal battery 110 using the electric power of the AC power supply grid 140, by closing the switches 7 and 8 and opening the switch 9, and by causing the bidirectional buck-boost converter 20 to perform voltage converting operation so that the ratio of voltage increase from the side of the AC power supply grid 140 towards the side of the internal battery 110 becomes almost 1. And, after the internal battery 110 has been charged, it is possible to drive the electric motor 200 by causing the bidirectional buck-boost converter 20 to perform voltage step-up operation from the side of the internal battery 110 towards the side of the inverter 30, after having opened the switch 8.

—Operation Using an External DC Power Supply 150—

Figure 5:
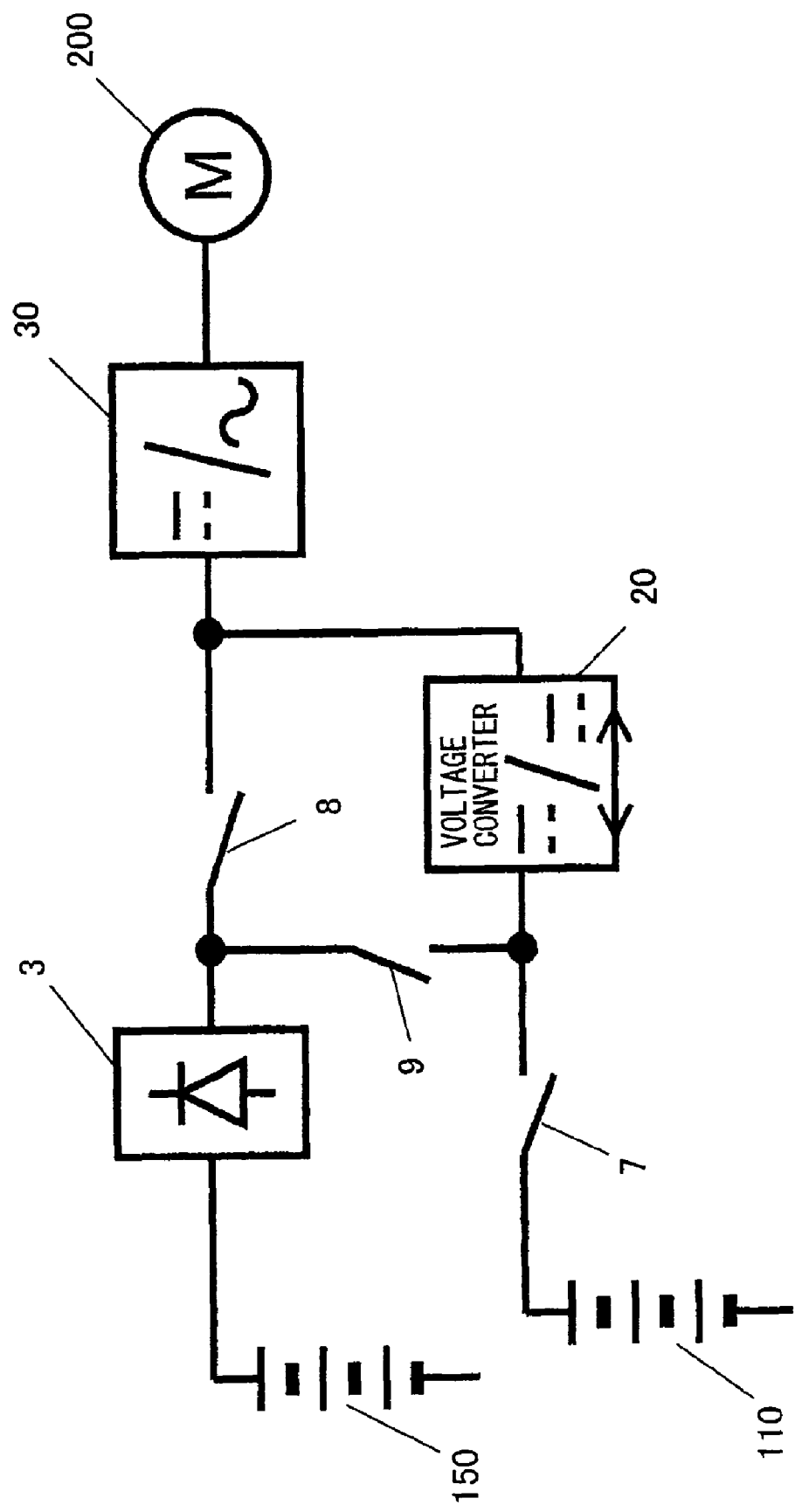
FIG. 5 is a block diagram for explanation of the operation of a power supply device 100.
Figure 6:
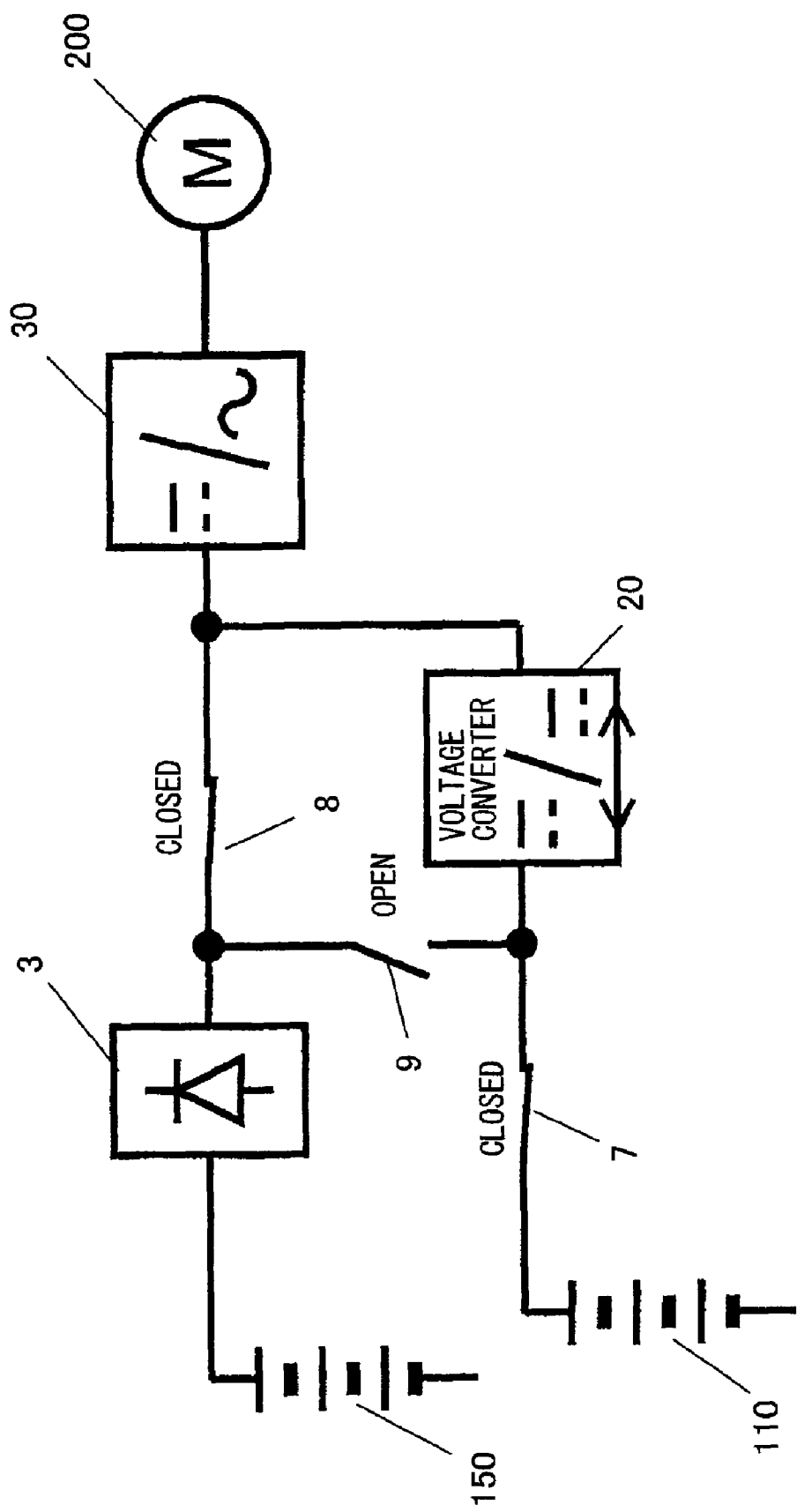
FIG. 6 is a block diagram for explanation of the operation of a power supply device 100.

As shown in FIG. 5, instead of the AC power supply grid 140, an external DC power supply 150 (i.e. an external battery) may also be used. Here, if the external DC power supply 150 is a 200 volt class power supply, the inverter 30 is an inverter for 200 volt system power supply, and the internal battery 110 is a 100 volt class voltage system, then, as shown in FIG. 6, by closing the switches 7 and 8 and opening the switch 9, it is possible to utilize either the electric power from the external DC power supply 150 or the electric power from the internal battery 110 as the electric power for driving the electric motor 200. Moreover, when the internal battery 110 has been discharged, it is possible to supply electric power for recharging the internal battery 110 from the external DC power supply 150, via the bidirectional buck-boost converter 20.

As an example of another mode of operation, a case will be described in which the external DC power supply 150 is a 100 volt class power supply, the inverter 30 is an inverter for 200 volt system power supply, and the internal battery 110 is a 100 volt class voltage system. In this case, in the same manner as in FIG. 6, it becomes possible to charge up the internal battery 110 using the electric power of the external DC power supply 150, by closing the switches 7 and 8 and opening the switch 9, and by causing the bidirectional buck-boost converter 20 to perform voltage converting operation so that the ratio of voltage increase from the side of the external DC power supply 150 towards the side of the internal battery 110 becomes almost 1. And, after the internal battery 110 has been charged, it is possible to drive the electric motor 200 by causing the bidirectional buck-boost converter 20 to perform voltage step-up operation from the side of the internal battery 110 towards the side of the inverter 30, after having opened the switch 8.

Figure 7:
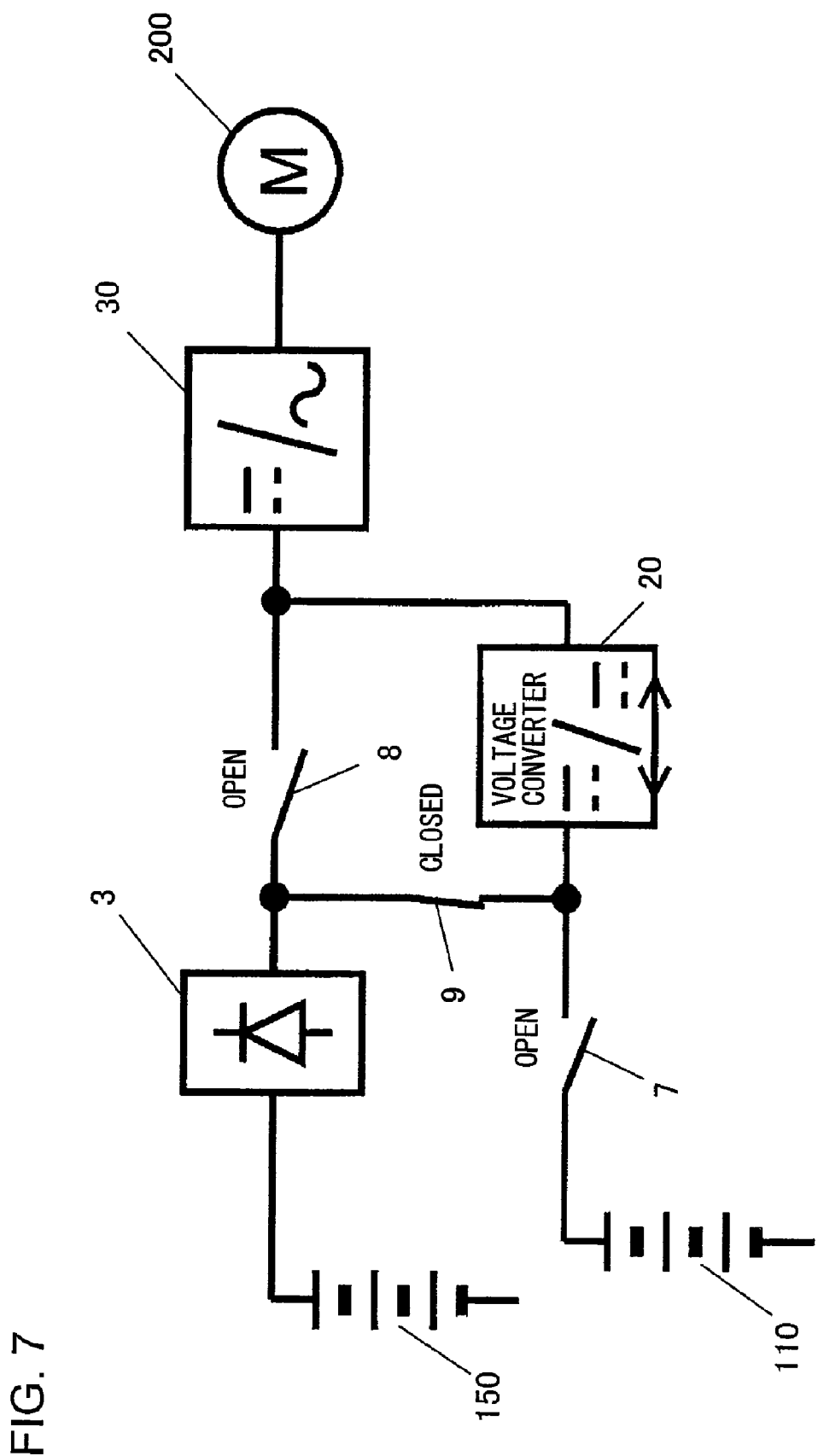
FIG. 7 is a block diagram for explanation of the operation of a power supply device 100.

Moreover, as shown in FIG. 7, by opening the switches 7 and 8 and closing the switch 9, it is also possible to use, not the internal battery 110, but the 100 volt class external DC power supply 150. In other words, it is possible to operate the electric motor 200 by stepping up the voltage of the external DC power supply 150 via the bidirectional buck-boost converter 20, and supplying this voltage to the inverter 30.

Operations and advantageous effects according to this embodiment (1) The power supply device 100 receives supply of electric power from the AC power supply grid 140 (or from the external DC power supply 150), or from the internal battery 110, and supplies a predetermined DC voltage to the inverter 30. And this power supply device 100 includes the bidirectional buck-boost converter 20 that has first and second terminals and performs voltage step-up converting or voltage step-down converting between the voltage at its one terminal and the voltage at its other terminal, and the switches 7, 8, and 9, and is connected to the control device 120 that controls the opening and closing action of these various switches. Due to this, the power supply device 100 is able to utilize electric power irrespective of the type or the voltage level of the electric power supply source. In addition, the power supply device 100 is able to supply electric power from one of the electric power supply sources to the other electric power supply source. For example, either a single phase 100 volt system, or a three phase 200 volt system, or a three phase 400 volt system may be used as the AC power supply grid. Moreover, instead of the rectified voltage of a three phase 200 volt system power supply or of a three phase 400 volt system power supply, it is possible for the inverter 30 to use electric power of lower voltage from either the internal battery 110 or the AC power supply grid 140 (or an external DC power supply 150).

(2) The control device 120 controls the switches 7, 8, and 9 to open and close, on the basis of the DC voltage that is obtained from the AC power supply grid 140 (or from the external DC power supply 150), and the DC voltage of the internal battery 110. At this time, the control device 120 obeys the commands of the operator. Or it may also perform this opening and closing control automatically by detecting the various voltages concerned.

(3) By opening the switch 9 and closing the switches 7 and 8, it is possible to charge up the internal battery 110 from the AC power supply grid 140 (or from the external DC power supply 150) via the bidirectional buck-boost converter 20.

(4) By closing the switch 9 and opening the switches 7 and 8, it is possible to supply a predetermined DC voltage to the inverter 30 from the AC power supply grid 140 (or from the external DC power supply 150) via the bidirectional buck-boost converter 20.

(5) By providing the power supply device 100, the inverter 30 that operates upon the DC output voltage of this power supply device 100, and the electric motor 200 that is driven by the inverter 30, it is possible to implement a hydraulic excavator 500 that uses the electric motor 200 as a drive power source.

(6) Since either the AC power supply grid or the external DC power supply (i.e. the external battery) may be used as the external electric power supply source that supplies electric power to the power supply device 100, accordingly it becomes possible for the hydraulic excavator to perform in a wide area by using this external electric power supply and/or the battery 110 that is internal to the main body of this hydraulic excavator.

Other Variant Embodiments (1) While in the embodiment described above the inverter 30 was used for driving the electric motor 200, it would also be possible to supply the DC voltage to some other device than an inverter. For example, it would be possible to supply armature voltage to a DC electric motor that operates at constant speed, not via any inverter. Moreover, it would also be possible to perform speed control of a DC electric motor by performing variable control of the voltage change ratio of the bidirectional buck-boost converter 20.

(2) While, in the embodiment described above, the electric motor 200 was used as a drive power source for the hydraulic pump 300, such an electric motor could also be used instead of the hydraulic motors for traveling 340 and 350, or instead of the hydraulic motor for pivoting 360 that rotates the upper rotating body portion of the hydraulic excavator.

(3) The power supply device according to the present invention is not limited to application to a hydraulic excavator; it may also be mounted to any type of construction machine.

The above explanation only relates to particular examples; the present invention is not to be considered as being limited to the above described embodiment and variant embodiments, and may be varied, provided that its particular characteristics are not departed from.

The embodiment and any one of variant embodiments may be combined; and the embodiment and a plurality of the variant embodiments may also be combined.

The variant embodiments may also be combined together in any manner.

Furthermore, other embodiments that are considered to fall within the scope of the technical concept of the present invention are also to be included within its range.

What is claimed is:

1. A power supply device that receives supply of electric power from a first electric power supply source or from a second electric power supply source and generates a predetermined DC voltage, comprising:
   a bidirectional voltage converter unit that includes a first terminal and a second terminal and performs step-up converting or step-down converting between the first terminal and the second terminal;
   a first switching unit 9 that switches a connection between the first electric power supply source and the first terminal of the bidirectional voltage converter;
   a second switching unit 7 that switches a connection between the second electric power supply source and the first terminal of the bidirectional voltage converter;
   a third switching unit that switches a connection between the first electric power supply source and the second terminal of the bidirectional voltage converter;
   an output unit that outputs a DC voltage at the second terminal of the bidirectional voltage converter unit as the predetermined DC voltage; and
   a switching control unit that controls switching of the first switching unit, the second switching unit and the third switching unit, wherein:
   if a first DC voltage obtained from the first electric power supply source is equal to the predetermined DC voltage and a second DC voltage obtained from the second electric power supply source is lower than the predetermined DC voltage, the switching control unit opens the first switching unit, closes the second switching unit and closes the third switching unit so that the first DC voltage is outputted as the predetermined DC voltage and the second DC voltage is converted to the predetermined DC voltage by the bidirectional voltage converter unit performing the step-up converting; and
   if the first DC voltage and the second DC voltage are lower than the predetermined DC voltage, the switching control unit opens the first switching unit, closes the second switching unit and closes the third switching unit so that the electric power from the first electric power supply source is transmitted to the second electric power supply source via the bidirectional voltage converter unit and thereby the second electric power supply is charged, and, after the second electric power supply has been charged, the switching control unit opens the third switching unit so that the second DC voltage is converted to the predetermined DC voltage by the bidirectional voltage converter unit performing the step-up converting.

2. A power supply device according to claim 1, wherein:
the first DC voltage from the first electric power supply source is obtained by rectifying an AC voltage of an AC power supply grid or obtained from an external battery;
the second DC voltage from the second electric power supply source is obtained from an internal battery;
the bidirectional voltage converter unit is a bidirectional type of voltage converting chopper circuit; and
the switching control unit controls the switching of the first switching unit, the second switching unit and the third switching unit, on the basis of the first DC voltage obtained from the first electric power supply source and the second DC voltage obtained from the second electric power supply source.

3. A power supply device according to claim 1, wherein if the first DC voltage is equal to the predetermined DC voltage, the second DC voltage is lower than the predetermined DC voltage and the second electric power supply source has been discharged, the switching control unit transmits electric power from the first electric power supply source to the second electric power supply source via the bidirectional voltage converter unit so that the first DC voltage is converted to the second DC voltage by the bidirectional voltage converter unit performing the step-down converting and the second electric power supply is charged.

4. A construction machine that uses an electric motor as a drive power source, comprising:
a power supply device according to claim 1;
an inverter circuit that operates upon the DC output voltage of the power supply device; and
an electric motor driven by the inverter circuit.

5. A construction machine according to claim 4, wherein:
the first electric power supply source is an external AC power supply grid or an external DC power supply; and
the second electric power supply source is a battery internal to a main body of the construction machine.

6. A power supply device that receives supply of electric power from a first electric power supply source or from a second electric power supply source and generates a predetermined DC voltage, comprising:
a bidirectional voltage converter unit that includes a first terminal and a second terminal and performs step-up converting or step-down converting between the first terminal and the second terminal;
a first switching unit that switches a connection between the first electric power supply source and the first terminal of the bidirectional voltage converter;
a second switching unit that switches a connection between the second electric power supply source and the first terminal of the bidirectional voltage converter;
a third switching unit that switches a connection between the first electric power supply source and the second terminal of the bidirectional voltage converter;
an output unit that outputs a DC voltage at the second terminal of the bidirectional voltage converter unit as the predetermined DC voltage; and
a switching control unit that controls switching of the first switching unit, the second switching unit and the third switching unit, wherein:
if a first DC voltage obtained from the first electric power supply source is equal to the predetermined DC voltage and a second DC voltage obtained from the second electric power supply source is lower than the predetermined DC voltage, the switching control unit opens the first switching unit, closes the second switching unit and closes the third switching unit so that the first DC voltage is outputted as the predetermined DC voltage and the second DC voltage is converted to the predetermined DC voltage by the bidirectional voltage converter unit performing the step-up converting; and
if the first DC voltage and the second DC voltage are lower than the predetermined DC voltage, the switching control unit closes the first switching unit, opens the second switching unit and opens the third switching unit so that the first DC voltage is converted to the predetermined DC voltage by the bidirectional voltage converter unit performing the step-up converting.

* * * * *